US010936647B2

(12) United States Patent
Abuelsaad et al.

(10) Patent No.: US 10,936,647 B2
(45) Date of Patent: Mar. 2, 2021

(54) GENERATING AND PLAYING BACK MEDIA PLAYLISTS VIA UTILIZATION OF BIOMETRIC AND OTHER DATA

(71) Applicant: INTERNATIONAL BUSINESS MACHINES CORPORATION, Armonk, NY (US)

(72) Inventors: Tamer E. Abuelsaad, Armonk, NY (US); Gregory J. Boss, Saginaw, MI (US); Randy A. Rendahl, Raleigh, NC (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/151,370

(22) Filed: Oct. 4, 2018

(65) Prior Publication Data

US 2020/0110814 A1    Apr. 9, 2020

(51) Int. Cl.
  *G06F 16/438*  (2019.01)
  *G06F 16/48*  (2019.01)
  *G06F 16/435*  (2019.01)
  *G06F 16/903*  (2019.01)

(52) U.S. Cl.
  CPC ........ *G06F 16/4387* (2019.01); *G06F 16/436* (2019.01); *G06F 16/48* (2019.01); *G06F 16/90335* (2019.01)

(58) Field of Classification Search
  None
  See application file for complete search history.

(56) References Cited

U.S. PATENT DOCUMENTS 7,571,183 B2    8/2009  Renshaw et al.
7,771,320 B2    8/2010  Riley et al.
7,962,482 B2    6/2011  Handman et al.
(Continued)

FOREIGN PATENT DOCUMENTS

WO    2007044370 A3    4/2007

OTHER PUBLICATIONS

Sawers et al., "WhatsApp to Bring Video calling to Android, iOS, and Windows Phone 'in the coming days'" VentureBeat, https://venturebeat.com/2016/11/14/, Nov. 14, 2016, pp. 1-10.
(Continued)

*Primary Examiner* — Uyen T Le
(74) *Attorney, Agent, or Firm* — Robert R. Aragona

(57) ABSTRACT

Generating a preferred media playlist based on a determined activity type. A media item is played from a media library. A computing device collects metadata regarding the played media item. The computing device receives sensor data from one or more sensors. The computing device determines an activity type based upon the received sensor data. The computing device generates a media item record comprising a media item identification for the media item, the metadata collected regarding the played media item, and the determined activity type. The media item records are ranked based upon the metadata regarding the played media and the determined activity type. The computing device generates a preferred media playlist comprising a plurality of generated media item records ranked highest.

20 Claims, 8 Drawing Sheets

(56) References Cited

U.S. PATENT DOCUMENTS

| | | | | |
|---|---|---|---|---|
| 8,793,727 | B2* | 7/2014 | Serdiuk | G06F 3/011 725/36 |
| 2009/0132453 | A1* | 5/2009 | Hangartner | H04L 67/1095 706/46 |
| 2010/0117836 | A1* | 5/2010 | Seyed Momen | G16H 40/20 340/573.1 |
| 2010/0325135 | A1* | 12/2010 | Chen | G10H 1/0008 707/759 |
| 2012/0221687 | A1* | 8/2012 | Hunter | G06F 16/435 709/219 |
| 2014/0052567 | A1 | 2/2014 | Bhardwaj et al. | |
| 2014/0075308 | A1* | 3/2014 | Sanders | G06F 3/04842 715/716 |
| 2014/0180448 | A1* | 6/2014 | Aminzade | G06F 16/436 700/91 |
| 2015/0182843 | A1 | 7/2015 | Esposito et al. | |
| 2015/0268800 | A1 | 9/2015 | O'Konski et al. | |
| 2016/0371372 | A1 | 12/2016 | Chong et al. | |
| 2017/0357479 | A1* | 12/2017 | Shenoy | G06F 3/167 |
| 2018/0088895 | A1* | 3/2018 | Pedersen | G06F 3/165 |
| 2020/0213790 | A1* | 7/2020 | Osborne | G16H 20/40 |

OTHER PUBLICATIONS

Roettgers, "Google Relaunches Google Play Music App With Context-Based Content Recommendations", https://variety.com/2016/digital/news/google-play-music-relaunch-1201 . . . , Nov. 14, 2016, pp. 1-3.

Spotify, "Get the Right Music, Right Now", Spotify Web Player, https://open.spotify.com/browse, printed Jun. 20, 2018, p. 1.

Mell et al., "The NIST Definition of Cloud Computing", National Institute of Standards and Technology, Special Publication 800-145, Sep. 2011, pp. 1-7.

* cited by examiner

| Velocimeter X | Range | Activity Type |
|---|---|---|
| 5 m/s | 4 m/s - 8 m/s | Jogging |
| 12.5 m/s | > 8.0 m/s | Running |
| 2.68 m/s | 0 m/s - 4 m/s | Walking |
| 0 m/s | 0 m/s | Sitting down |

Figure 4

GENERATING AND PLAYING BACK MEDIA PLAYLISTS VIA UTILIZATION OF BIOMETRIC AND OTHER DATA

BACKGROUND

The present invention relates generally to generation and playing back of media playlists, and more specifically to utilizing biometrics and other data to generate and present a media playlist to a user.

BRIEF SUMMARY

Embodiments of the present invention disclose a method, computer program product, and computer system for generating a preferred media playlist based on a determined activity type. A media item is played from a media library. A computing device collects metadata regarding the played media item. The computing device receives sensor data from one or more sensors. The computing device determines an activity type based upon the received sensor data. The computing device generates a media item record comprising a media item identification for the media item, the metadata collected regarding the played media item and the determined activity type. The media items are ranked based upon the metadata regarding the played media item and the determined activity type. The computing device generates a preferred media playlist comprising a plurality of generated media item records ranked highest.

BRIEF DESCRIPTION OF THE DRAWINGS

FIG. 4 illustrates exemplary set 400 of numerical values of sensor data and preconfigured ranges of sensor data limits for determining activity type, in accordance with an embodiment of the invention.

DETAILED DESCRIPTION

Figure 1:
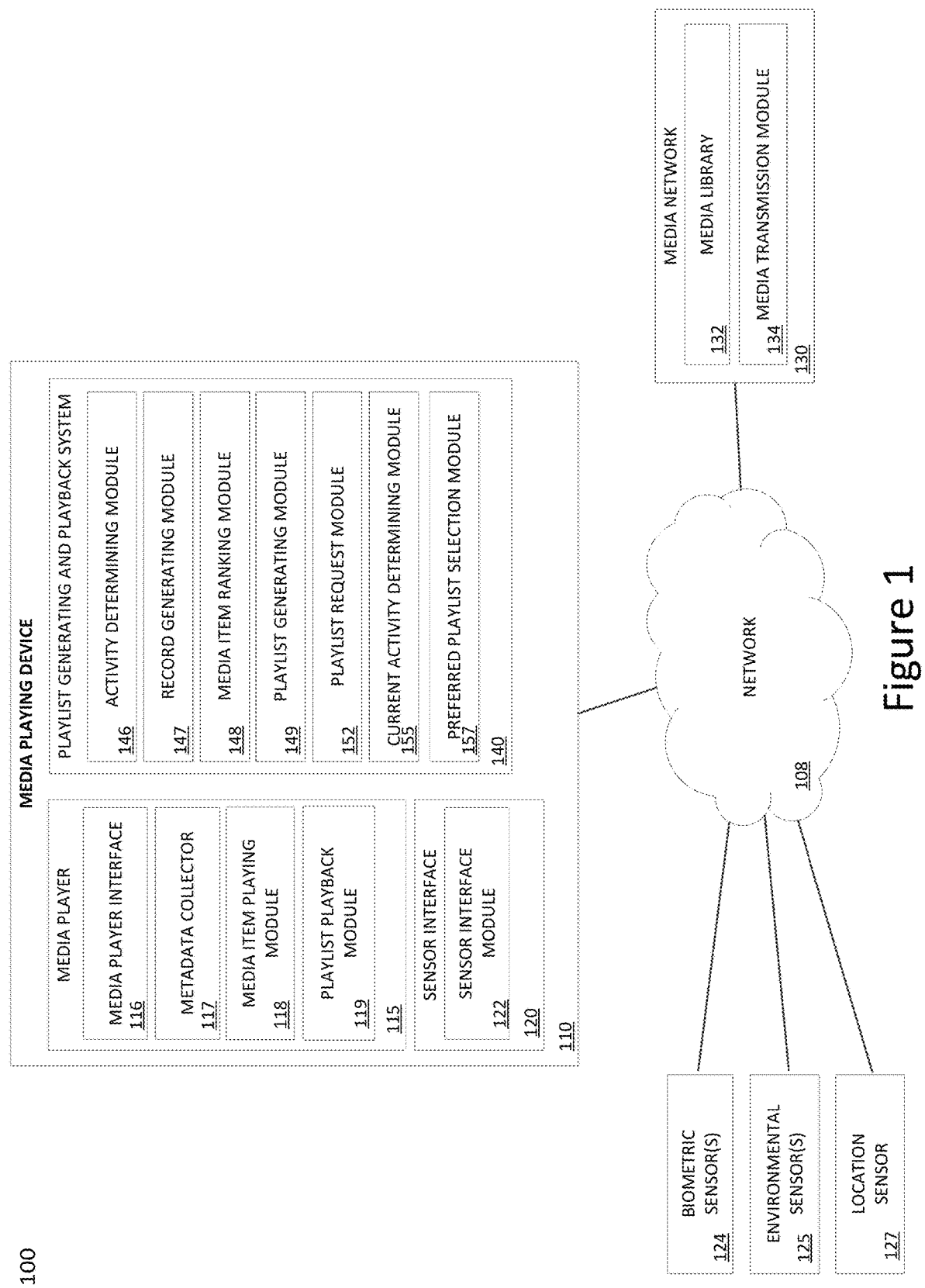
FIG. 1 is a block diagram illustrating a computing environment 100 for generating and playing back of preferred media playlists via utilization of biometric, environmental, and/or location sensor data, in accordance with an embodiment with the present invention.

Streaming of music, video, or any other multimedia from a media playlist is an increasingly common means of playing media items to a user. In streaming of media items, the media items from the media playlist are played to a user from a media network via a media playing device. Users enjoy playing multimedia via the media playing device as they perform various activities, including running, jogging, walking, hiking, or even as they sleep, lay on a beach, or drive. Users may select and stream different multimedia based upon the activity he or she is performing, whether the activities use little to no physical effort such as sleeping or sitting down, moderate physical effort such as walking, or high physical effort such as running or jogging. Rather than manually selecting by the user which media item to play, with the user making the decision based on his or her own activity, mood, etc., modern technology presents the opportunity to automatically collect biometric, environmental, and/or location sensor data and/or environmental sensor data from various sensors, and automatically determine, based upon this data, which activity the user is performing. In accordance with the invention, the determined activity can then be used to automatically generate a playlist and/or decide which media item from a playlist to play. Biometric, environmental, and/or location sensor data collected may include, for example, heart rate, speed, acceleration, velocity, skin temperature, oximetry, skin conductance, location of the user, ambient temperature, identification of a sound, source of a sound, current weather, etc. The biometric, environmental, and/or location sensor data may be used in any combination to determine the activity type the user is performing, and, as further discussed herein, to generate a media playlist and/or determine a media item to play which the user listens to or watches while performing a physical activity. In practice, this biometric, environmental, and/or location sensor data changes as the activities of the user change throughout time, and the presently disclosed invention also presents the opportunity to determine a new media item to play based upon a newly determined activity type, as well as provides for generation of new media playlists as well as updating of currently existing playlists based upon a new determination of activities of the user and other data.

"Media items" as discussed herein refer to an audio-based, video-based, or movie-based computerized entity that a media playing device accesses and plays. Each media item may be an audio file available for playing back via a computing device, a video or movie file for playing back via a computing device, a link to access such an audio file or video file, or the equivalent. A media item may be downloaded to a media playing device as an audio-based, video-based, or movie-based file downloaded or streamed from a media network designed for streaming or downloading audio-based or video-based media items. Audio-based media item formats include but are not limited to .mp3, .wav, .wma, .ogg, .midi, etc. Video-based or movie-based media item formats include but are not limited to .mp4, .avi, .flv, .wmv, .mov, etc.

"Media playlist(s)" as discussed herein refer to a queue of one or more media items, played sequentially or randomly based upon user selection, and upon the action of the presently disclosed invention. Each media playlist may be implemented as a linked-list, array, tree structure, or any other computerized data structure or other object (or series of objects) providing access to the one or more media items in the media playlist. The media items in the playlist may be played by media playing device in an ordered sequence or an unordered, random sequence. Media playlists may be manually generated by a user, or automatically generated and/or modified by the presently disclosed invention, as further discussed herein.

"Media network" as discussed herein refers to a server, website, application program, or any other computerized source from which one or more media items are hosted, stored, linked-to, accessed, downloaded, etc. directly or indirectly. Media networks give user computing devices access to play, download, stream, or utilize in any way one or more media items from a media library of media items contained on the media network. Each media network may utilize one or more centralized computing device(s) storing media items, storing links to media items, etc., or may utilize a high number of computing devices storing media items or links to media item, links to pieces of media items available across a distributed computer network, etc.

FIG. 1 is a block diagram illustrating a computing environment 100 for generating and playing back of preferred media playlists via utilization of biometric, environmental, and/or location sensor data, in accordance with an embodiment with the present invention. Displayed in FIG. 1 is media playing device 110, media network 130, and sensors 124, 125, 127. All are connected via network 108. In various embodiments, network 108 represents, for example, an internet, a local area network (LAN), a wide area network (WAN) such as the Internet, and includes wired, wireless, or fiber optic connections. In general, network 108 may be any combination of connections and protocols that will support communications between media playing device 110, media network 130, and sensors 124, 125, 127 in accordance with an embodiment of the invention.

Media playing device 110, media network 130, and sensors 124, 125, 127 are utilized in numerous ways in environment 100 in the context of the presently disclosed invention. In an embodiment of the invention, media playing device 110 is utilized in generation of a media playlist based on a determined activity type. In generation of the preferred media playlist, media playing device 110 plays one or more media items from media network 130 to a user upon request or automatically. Media playing device 110 may be an mp3 player, an mp4 player, a smartphone with audio and/or video playing hardware, a television or monitor with audio and video playing hardware, a smart speaker with audio playing hardware, a computer (such as a laptop, tablet, personal computer, netbook, desktop, etc.) with audio and video playing hardware and/or a software installed, implemented as software executing on a computing device, etc. In general media playing device 110 may be any computing device having capability to download and/or stream media items for listening and/or viewing by the user, with some functionality executing internally or externally, etc. As media playing device 110 plays media items to the user, various sensors (including, in various embodiments, biometric sensor(s) 124, environmental sensor(s) 125, and/or location sensor(s) 127, etc.) gather sensor data from the user. Sensor interface 120 reads and congregates the sensor data received. Biometric sensor(s) 124, environmental sensor(s) 125, and/or location sensor(s) 127, in various embodiments, may be each integrated with the media playing device 110, or function independently from the media playing device 110. Biometric sensor(s) 124, environmental sensor(s) 125, and/or location sensor(s) 127 may be, by each be implemented, for example, by means of non-limiting example, with dedicated sensors, or a smartwatch, a fitness tracking device, a mobile computing device, etc. Each sensor 124, 125, 127, if present, may be implemented in the same physical device or different ones.

Sensor interface 120 outputs sensor data gathered from biometric sensor(s) 124, environmental sensor(s) 125, and location sensor(s) 127 to playlist generating and playback system 140, for a determination of an activity the user is engaged in, whether the activity be a certain sport, hiking, walking, jogging, driving a car, etc. Sensor interface 120 may receive data from sensor(s) 124, 125, 127 via a wireless connection across network 108, a wired connection across network 108, or otherwise in various embodiments of the invention (such as across an internal bus, if sensor(s) 124, 125, 127 are integrated with the media playing device 110). Playlist generating and playback system 140 generates one or more media item records to be used to generate a preferred media playlist associated with the determined activity type for future utilization by the user when he or she engages in the determined activity type, allowing the user to listen to and enjoy the same media items he or she enjoyed in the past when performing the same (or similar) activity. The preferred media playlist is stored locally on media playing device 110, on the media network 130, or elsewhere for later utilization.

After generation of the preferred media playlist as discussed, the preferred media playlist is played back to a user upon his or her request, based on then-current real-time collected sensor data. During operation, media playing device 110 receives a request to provide the preferred media playlist to a user. Sensor interface 120 receives real-time biometric, environmental, and/or location data associated with the user from biometric sensor(s) 124, environmental sensor(s) 125, and/or location sensor(s) 127. Playlist generating and playback system 140 determines a current user activity based on the received real-time sensor data received from sensor(s) 124, 125, 127. Playlist generating and playback system 140 automatically selects the preferred media playlist (of a plurality of previously generated preferred media playlists) based upon the determined current user activity. Playlist generating and playback system 140 selects and presents the preferred media playlist to the user via media playing device 110, streaming the preferred media playlist from a remote source or playing the preferred media playlist back directly from a local source. If the preferred media playlist is stored on the media network 130, the media network 130 may stream the preferred media playlist to the user via the media playing device 110.

Media playing device 110 and media network 130 may include internal and external hardware components as depicted and described further in detail with reference to FIG. 5, below. In other embodiments, each of media playing device 110 and media network 130 may be implemented in a cloud computing environment, as described in relation to FIGS. 6 and 7, below. In a still further embodiment, media playing device 110 and media network 130 are embodied in physically the same computing device, with all communications between various components made internally.

As is displayed in connection with FIG. 1, in an embodiment of the invention, media playing device 110 includes a media player 115, a sensor interface 120, and a playlist generating and playback system 140.

Media player 115 represents hardware and/or software associated with media playing device 110 for playing back of media items from a media library 130 to the user, in connection with generation of preferred media playlists, and later playback of the preferred media playlists to the user. Media player 115 includes a media player interface 116, a metadata collector 117, a media item playing module 118, and a playlist playback module 119.

Media player interface 116 represents a software and/or hardware interface, such as one or more physical buttons, soft buttons, or a graphical user interface (GUI) (displayed such as with display screen 920 of FIG. 5) associated with media playing device 110, for a user at media playing device 110 to make selections with regard to media items and/or "mark" media items played back to him or her with the media playing device 110. User selections and/or markings presented via the media player interface 116 are collected by the presently disclosed invention as "metadata" by metadata collector 117 of media player 115, and the metadata collected is utilized as discussed herein. Media player interface 116 may, for example, allow user to play a media item, to skip a media item being played by the media player 116, add a played media item to the preferred media playlist, or download the media item to offline storage. In various embodiments of the invention, such data is collected by the metadata collector 117 as "metadata." Media player interface 116 may also allow a user to mark a media item, such as with a "like" for a media item, a "love" for a media item (a "love" rating indicating a superlative value over a "like" of a media item), a "dislike" for a media item, rate a media item (such as, in an embodiment of the invention, on a 1-10 scale, with a 1-5 rating indicating a low user rating, and a 6-10 indicating a high user rating), etc., with all such data also collected as "metadata." In alternative embodiments, media player interface 116 may be a microphone for receiving voice commands from a user, allowing the user to use his or her voice to make selections with regard to media items and/or "mark" media items. After generation of preferred media playlists, media player interface 116 may also allow the user to issue a request to the playlist request module 152 to provide a generated preferred media playlist to the user when engaged in a current activity, as further discussed below in connection with playlist request module 152.

Metadata collector 117 represents software and/or hardware associated with media player 115 to allow for collection, storage, and utilization of metadata regarding media items played to the user. As is further discussed, the collected metadata is utilized in the context of the presently disclosed invention to generate media item records and thereby generate preferred media playlists. "Metadata" as discussed herein is data regarding the media items discussed in the context of the presently disclosed invention, but need not specifically include the contents of data included in the media item itself (i.e. need not include the audio data, video data, movie data, etc. itself). In the context of the presently disclosed invention, metadata for each media item may include (but is not limited to), receipt by the media player interface 116 of a "like" marking, receipt of a "love" marking, receipt of a "dislike" marking, receipt of a high/low rating, as well as whether the media item was skipped, added to a playlist, downloaded for use offline, etc. Metadata may further include metadata received by the media player interface 116 and collected by the metadata collector 117, including a number of times the media item is played, a total number of "like"/"love"/"dislike" etc. markings, a total number of times the media item was skipped, average calculated rating, total number of playlists including the media item, total number of times the media item was downloaded offline from media network 130. Metadata collector 117 may further collect media metadata directly regarding media items from the media network 130 and utilize this metadata as further discussed herein.

Media item playing module 118 represents hardware and/or software for media player 115 to play a media item or media items to a user of the media playing device 110. In various embodiments, media item playing module 118 is an audio file player, a video file player, a movie player, etc. executing at least in part on media player 115. In the context of the presently disclosed invention, media item playing module 118 plays back audio files, video files, movie files, etc. to the user, allowing for further functionality in the generation of media item records. Media item playing module 118 may operate in conjunction with the playlist playback module 119 to play back media items in preferred media playlists to a user.

Playlist playback module 119 represents hardware and/or software for media player 115 to manage media playlists presented to the user, and play back preferred media playlists to a user upon request. In an embodiment of the invention, playlist playback module 119 may operate in conjunction with the media item playing module 118 and the media player interface 116 to play back the media items in the preferred media playlist to the user. Certain functionality associated with the playlist playback module 119 may be displayed to the user via the media player interface 116, such as the media item being played, the preferred media playlist currently being played, or multiple preferred media playlists for selection by the user via media player interface 116, etc.

In an embodiment of the invention embodiment, sensor interface 120 includes a sensor interface module 122.

Sensor interface 120 represents software and/or hardware to receive, process, and forward (if necessary) sensor data from sensors 124, 125, 127 such as are present in the embodiment of the invention. Sensor interface 120 may present further functionality to activate, deactivate, or manage sensors 124, 125, 127 via network 108. Sensor data received is further utilized as discussed herein. In embodiments of the invention where sensors 124, 125, 127 are located in the same physical device as the media playing device 110, sensor interface 120 may be at least in part a bus with necessary associated functionality to process sensor data internal to media playing device 110.

In an embodiment of the invention, playlist generating and playback system 140 includes for generation of preferred media playlists, an activity determining module 146, a record generating module 147, a media item ranking module 148, and a playlist generating module 149.

Activity determining module 146 represents software and/or hardware for the determination of the activity type being performed by the user in real-time, based upon received sensor data received from the sensor interface 120. Historical data for various activity types is stored or is accessible by activity determining module 146. Real-time sensor data is received by the activity determining module 146 from the sensor interface module 122. In embodiments of the invention where biometric sensor(s) 124 are present, sensor data received via the sensor interface module 122 from biometric sensor(s) 124 may include heart rate, acceleration, velocity, speed, oximetry, skin conductivity, and/or skin temperature of the user performing an activity. In embodiments of the invention where environmental sensor(s) 125 are present, sensor data received via the sensor interface module 122 from environmental sensor(s) 125 may include ambient temperature, wind speed, barometric pressure, angular velocity, and/or sources of sound from the environment surrounding the user performing the activity. In embodiments of the invention where location sensor 127 is present, sensor data received via the sensor interface module 122 may include global positioning coordinates, a location's name, and/or an address where the user is located and currently performing the activity, to obtain a user location. Available data, whether received from one or more of biometric sensor(s) 124, environmental sensor(s) 125, and location sensor 127 is utilized by the activity determining module 146 to determine the activity type being performed, based on comparisons or mapping with historical data of similar types for various activity types (including comparisons or mapping with historically determined activity types, determined by the activity determining module 146 in the past). For example, historical data indicating baseball, jogging, running, walking, swimming, tennis, or any other activities is accessed, and a best-fit comparison may be performed by activity determining module 146 to indicate baseball, jogging, running, walking, swimming, tennis is currently being played or performed by the user. The determined activity type is further utilized as discussed herein. In an embodiment of the invention, activity determining module 146 determines a current user activity by comparing received real-time sensor data with a preconfigured range of sensor data limits for the available sensor data, and determines the current user activity via utilization of a best fit analysis or machine learning based upon the preconfigured range of sensor data. In a further alternative embodiment of the invention, activity determining module 146 may consider weather data and/or timestamps available locally to the media playing device 110 or externally via network 108 to determine the current activity type (or aid in determining the current activity type, in combination with other sensor data available).

Record generating module 147 represents software and/or hardware for the generation of media item records for utilization in connection with the presently disclosed invention. Media item records are generated based upon media items played by the media item playing module 118 to the user, and the user's response to them, collected as metadata by the metadata collector 117 (as well as other metadata collected by the metadata collector 117, as further discussed herein), along with the determined activity type determined by the activity determining module 146. As media player interface 116 plays media items, and metadata is collected by the metadata collector 117 (as further discussed in connection with the metadata collector 117), record generating module 147 generates media item records based upon the collected metadata and/or the determined activity type. The media item records generated by the record generating module 147 may be stored as an object, database tuple, spreadsheet, or in any other computerized form in primary storage, secondary storage, remotely, etc. for further utilization in connection with the presently disclosed invention. The stored media item records generated by record generation module 147 may each include one or more of the various types of metadata available for the individual media item (as discussed in connection with the metadata collector 117 and elsewhere herein), as well as the determined activity type (as discussed in connection with the activity determining module 146 and elsewhere herein). The media item records generated are utilized as further discussed below.

Media item ranking module 148 represents software and/or hardware for the ranking of media item records generated by the record generating module 147, based upon the likelihood of being enjoyed by the user when performing the determined activity type. Media item ranking module 148 ranks the media item records from the most likely to please the user to the least likely to please the user during the determined activity, based on the available types of metadata regarding each played media item and the determined user activity (both metadata and determined activity type available from media item records generated by the record generating module 147, as discussed previously). Since, in various embodiments, different types of metadata may be available, media item ranking module 148 may rely on a best-fit algorithm, heuristics, machine learning, or otherwise to determine which media item records are most likely for the user to enjoy when performing the determined activity type. Historical metadata is given strong preference, and high preference is also given by the media item ranking module 148 to media item records with the same determined activity type, but in further embodiments, the media item ranking module 148 may rely on similarity of the determined activity type, if there are no perfect matches of the same determined activity type available or a limited number.

Playlist generating module 149 represents software and/or hardware for the generation of one or more preferred media playlists from generated media item records. Media item records of the preferred media playlists comprise one or more generated media item records ranked highest by the media item ranking module 148. The preferred media playlists may contain any number of media item records, and, in various embodiments, are automatically played back to the user via the playlist playback module 119 as described elsewhere herein. In a further embodiment of the invention, playlist generating module 149, when generating preferred media playlists, may also access historically generated media item records with a same determined activity type from a database of such media item records (the database associated with the playlist generating module 149 or external to media playing device 110), and add the selected historically generated media item records with the same determined activity type to the preferred media list, for enjoyment by the user.

In an embodiment of the invention, playlist generating and playback system 140 also includes, for later playback of generated preferred media playlist, a playlist request module 152, a current activity determining module 155, and a preferred media playlist selection module 157.

Playlist request module 152 represents software and/or hardware for the receipt of a request from the user for the providing of a preferred media playlist to the user. The request may come directly from the user via the media player interface 116, by the user, for example, by activating a hard button, soft button, or graphic user interface of the media player interface 116. In alternative embodiments of the invention, playlist request module 152 may automatically generate a request to provide the preferred media playlist when sensor interface module 122 begins receiving sensor data from the sensors 124, 125, and/or 127, indicating the user is performing an activity, allowing the presently disclosed invention to automatically begin presenting the preferred media playlist to the user when the user engages in an activity.

Current activity determining module 155 represents software and/or hardware for a determination of the current activity of the user. Current activity determining module 155 operates in a similar fashion to activity determining module 146, and the discussion above is adopted here, save that the sensor data received via the sensor interface module 122 is utilized to determine the current activity for the purposes of providing a previously generated preferred media playlist to the user. The determined current activity is utilized by the preferred playlist selection module 157 as discussed herein.

Preferred playlist selection module 157 represents software and/or hardware for selecting automatically the preferred media playlist based upon the determined user activity (determined by the current activity determining module 155, as discussed above). After the determination is made of the current user activity, preferred playlist selection module 157 automatically selects the preferred media playlist(s) which indicates a same or a similar determined activity. In embodiments of the invention where more than one preferred media playlist exists, preferred playlist selection module 157 may utilize other available metadata available via the metadata collector 117 to determine which preferred media playlist should be played to the user if multiple preferred media playlists exist. In the various embodiments, the preferred media playlist is played back to the user via the playlist playback module 119. Playing back of the preferred media playlist to the user may also prompt for the collection of new metadata from the user, allowing for the generation of new preferred media playlists in the preferred playlist automatically presented to him or her, or improvement of currently existing preferred media playlists), if, for example, the user skips a song or movie, "likes" it, "dislikes" it, etc. (allowing similar media items to be added or removed, respectively).

Biometric sensor(s) 124, environmental sensor(s) 125, and location sensor 127 provide various functionality in the generation and playback of preferred media playlists, as further discussed herein. In various embodiments, one, two, or all three of biometric sensor(s) 124, environmental sensor(s) 125, and location sensor 127 are present.

Biometric sensor(s) 124, if present in the embodiment of the invention, represent a hardware component operatively connected to sensor interface module 122 that detects and measures biometrics of a user in real-time, including but not limited to heart rate, acceleration, velocity, speed, oximetry, skin conductivity for sweat, and/or skin temperature. Biometric sensor(s) 124 may be operatively connected to sensor interface module 122 via a wired or wireless connection, but in various embodiments biometric sensor(s) 124 may be integrated with the media playing device 120. Biometric sensor data collected by the biometric sensor(s) 124 is utilized as further discussed in the presently disclosed invention. In various embodiments biometric sensor(s) 124 may be implemented as dedicated sensors such as accelerometer(s), velocimeter(s), a galvanic skin response sensor, etc., or may be implemented in a smartwatch, a fitness tracking device, other wearable technology, or simply with a mobile computing device (or other computing device).

Environmental sensor(s) 125, if present in the embodiment of the invention, represent a hardware component operatively connected to sensor interface module 122 that detects and measures one or more environmental factors in real-time including, but not limited to, ambient temperature, wind speed, barometric pressure, angular velocity, sources of sound, etc. Environmental sensor(s) 125 may be operatively connected to sensor interface module 122 via a wired or wireless connection, but in various embodiments environmental sensor(s) 125 may be integrated with the media playing device 120. Environmental sensor data collected by the environmental sensor(s) 125 is utilized as further discussed in the presently disclosed invention. Sources of sound and background noise, for example, may be utilized by the presently disclosed invention to extrapolate a location where the user currently is, and is utilized by the current activity determining module 155 in a determination of the activity the user is performing. In various embodiments environmental sensor(s) 125 may be implemented as dedicated sensors such as with a digital thermometer, an anemometer, a microphone, etc. or may be implemented in a smartwatch, a fitness tracking device, other wearable technology, or simply with a mobile computing device (or other computing device).

Location sensor 127, if present in the embodiment of the invention, represents a hardware component operatively connected to sensor interface module 122 that detects and measures a user's location in real time, including, but not limited to the user's global positioning coordinates, a location's name, and/or an address where the user is located. Location sensor 127 may be operatively connected to sensor interface module 122 via a wired or wireless connection, but in various embodiments location sensor 127 may be integrated with the media playing device 120. Location sensor data collected by the location sensor 127 is utilized as further discussed in the presently disclosed invention. In various embodiments, location sensor 127 may be implemented as dedicated sensors such as with a global positioning system, a location triangulation system based on cellular or wi-fi data, LORAN, or any other location detection system. In other embodiments, location sensor 127 may be a smartwatch, a fitness tracking device, other wearable technology with access to location sensor data, or simply a mobile computing device (or other computing device).

Media network 130 is a website, application program, database, or other repository of media items from which one or more media items are accessed by the media playing device 110, in connection with generation and playback of preferred media playlists as further discussed herein. Media network 130 provides the media playing device 110 access to download, stream, and/or otherwise access one or more media items available via the media network 130. In an embodiment of the invention, playlist generating and playback system 140 accesses media network 130 to select one or more media items from a media library 132 to play to the user during generation of a preferred playlist, as further discussed herein. In various embodiments, media network 130 may also provide access to media items for playback to the user, via utilization of the preferred playlist, as further discussed herein.

In various embodiments of the invention, media network 130 includes a media library 132 and a media transmission module 134.

Media library 132 represents hardware and/or software to provide a collection of media items for access by media playing device 110. Media items contained or linked-to within the media library 132 may include audio, video, movies, etc. In embodiments where the media network 130 is a database, media items may be directly contained within computerized storage within the media library. In embodiments where the media network 130 is a website or application, media items may be directly hosted within the media library 132, or linked-to from other external locations available on media network 130 and/or network 108. Media library 132 may further include media metadata regarding each media item contained in the media library 132 (or available from the media library 132), and may include data that provides information such as means of creation of the media data, purpose of the media data, time and date of creation, creator or author, location on a database, library, or computer network where the data was created, standards used, file size, data quality, source of the media data, and process used to create the media data.

Media transmission module 134 is a hardware and/or software component that transmits media items from media library 132 to a media playing device 110 for playback to the user, utilized in the context of the presently disclosed invention for generation of preferred playlists, and, in various embodiment, for playback of the preferred playlists by streaming of media items to the user, by links within the preferred playlist. Media transmission module 134 may transmit media items including audio files, video files, movie files, or any other. Media transmission module 134 may "stream" media items in real-time, or provide for their download by media playing device 110 prior to playback by the media playing device 110.

Figure 2A:
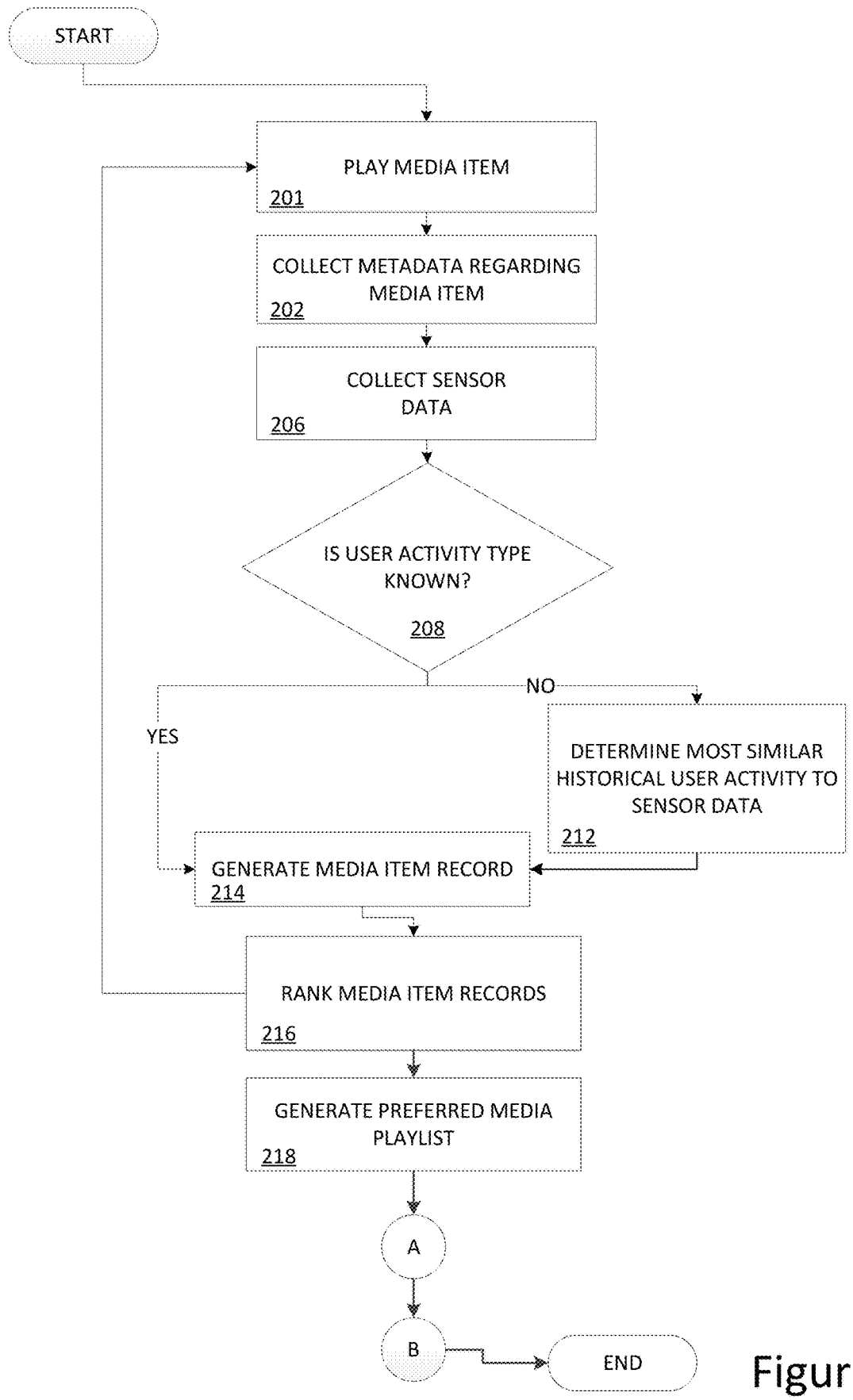
FIG. 2A is a flowchart depicting operational steps of playlist generating and playback system 140, in accordance with an embodiment of the invention.

FIG. 2A is a flowchart depicting operational steps performed by playlist generating and playback system 140, in accordance with an embodiment of the present invention.

FIG. 2A displays steps in generation of preferred media playlists by the playlist generating and playback system 140. As displayed in step 201, media item playing module 118 plays a media item from media library 132 of media network 130 to a user. At step 202, metadata collector 117 collects metadata regarding the played media item. The metadata of the played media item may include one or more user actions including receiving a "like" marking, receiving a "love" marking, receiving a "dislike" marking, receiving a rating, skipping to another media item in a queue of media items, adding the played media item to a playlist, and downloading the played media item to the media playing device 110 from the media network 130. Metadata may additionally include other information about the played media item including total number of plays, total number of received "like" markings from multiple users, total number of received "love" markings from multiple users, total number of received "dislike" markings from multiple users, total number of received ratings from multiple users, average calculated rating, total number of times for skipping to another media item by multiple users, total number of preferred media playlists that include the media item, and total number of times the media item was downloaded multiple media playing device(s) 110 from the media network 130. Additionally, metadata collector 117 may collect further new metadata related to media items played from a preferred media playlist selected by playlist playback and generation system 140, as shown in FIG. 2B.

Continuing with regard to FIG. 2A, at step 206, sensor data is received by sensor interface module 122 from biometric sensor(s) 124, environmental sensor(s) 125, and/or location sensor 127 present in the embodiment of the invention. At step 208, activity determining module 146 determines the user's activity type based upon the received sensor data, and determines whether the activity type is a known type. If the activity type is known, execution proceeds to step 214. If the activity type is not known, at step 212 the activity determining module 146 determines a most similar activity type to historical user activity based upon the received sensor data (utilizing a best fit analysis of the sensor data to historical data, machine learning based upon similarity of the sensor data to historical data, or another computerized method), and execution proceeds to step 214. At step 214, the known activity type or the most similar activity type is utilized to generate one or more media item records based upon the metadata regarding the played item and the determined activity type or the most similar activity type. At step 216, the media item ranking module 148 ranks the media item records based upon the metadata regarding the played media item and the determined activity type or the most similar activity type. At step 218, playlist generating module 149 generates a preferred media playlist comprising a plurality of generated media item records ranked highest (other generated media items in the preferred media playlist generated, by means of non-limiting example, previously in other iterations of the presently disclosed invention). The preferred media playlist is stored for later use. In an embodiment of the invention, execution proceeds to FIG. 2B.

Figure 2B:
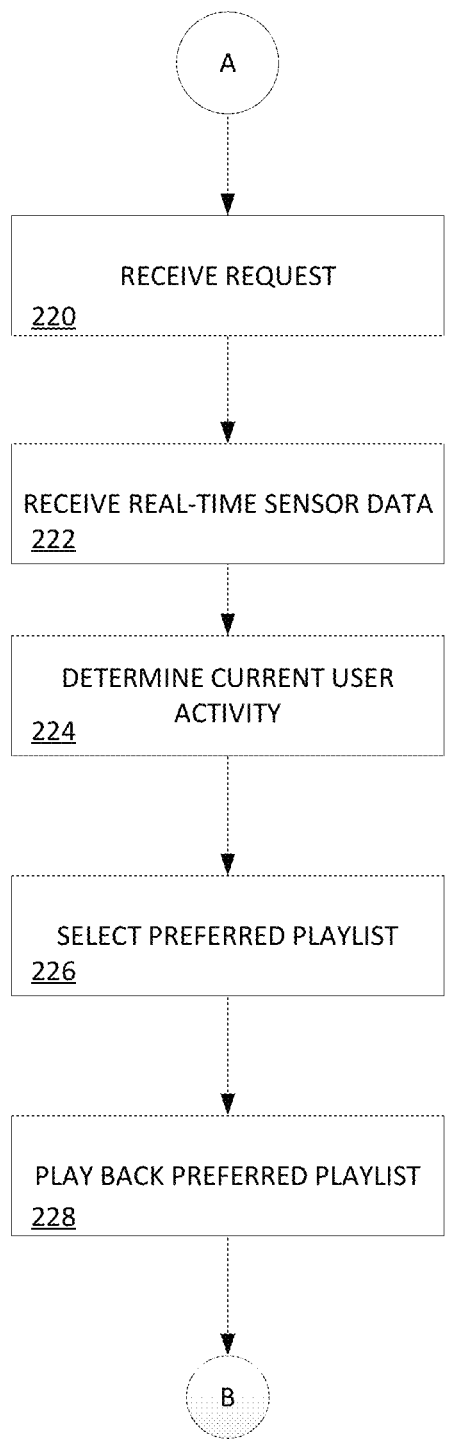
FIG. 2B is a flowchart depicting operational steps of the playlist generating and playback system 140, in accordance with an embodiment of the invention.

FIG. 2B is a flowchart depicting operational steps performed by playlist generating and playback system 140, in accordance with an embodiment of the invention. FIG. 2B displays steps in playback of preferred media playlists by playlist generating and playback system 140. At step 220, playlist request module 152 receives a request to provide the preferred media playlist to the user (the preferred media playlist generated, as described in FIG. 2A). At step 222, real-time sensor data is received via the sensor interface module 122 from one or more sensors 124, 125, and/or 127. At step 224, current activity determining module 155 determines a current user activity based upon received real-time sensor data, received by the sensor interface module 122. At step 226, preferred playlist selection module 157 selects the preferred playlist of a plurality of preferred playlists available based upon the determined current user activity. At step 228, playlist playback module 119 plays the preferred media playlist back to the user.

Figure 3:
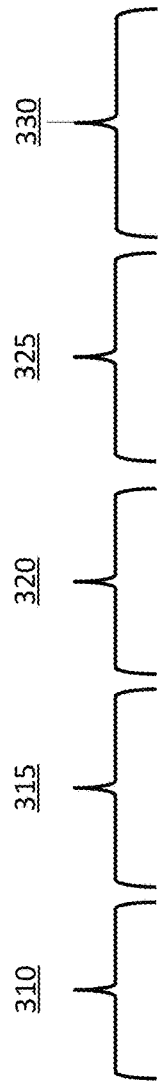
FIG. 3 depicts an exemplary set of media item records 300, in accordance with an embodiment of the invention.

FIG. 3 illustrates an exemplary set of four media item records 300 generated by record generating module 147, in accordance with an embodiment of the present invention. In the exemplary embodiment, the media item records 300 each include a media item identification 310 (here, name of the audio file), a determined activity type 315, and collected metadata, in this embodiment including a timestamp 320 (indicating time of creation of the media item record), a location 325, and weather data 330. The media item records displayed 300 are further utilized as described herein.

FIG. 4 illustrates an exemplary set 400 of numerical values of sensor data received from an velocimeter x, and a preconfigured range of sensor data limits for determining four activity types by current activity determining module 155, in accordance with an embodiment of the invention. As discussed previously, biometric sensor 124 is, in an embodiment of the invention, a velocimeter. In the illustrated embodiment, velocimeter x measures velocities of a user of different times as displayed 410, 5 m/s, 12.5 m/s, 2.68 m/s, and 0 m/s. Preconfigured ranges of sensor data limits are displayed 420. Based upon the preconfigured ranges of sensor data limits, current activity determining module 155 is able to determine the user's activity type, as displayed 430, jogging, running, walking, or sitting down.

Figure 5:
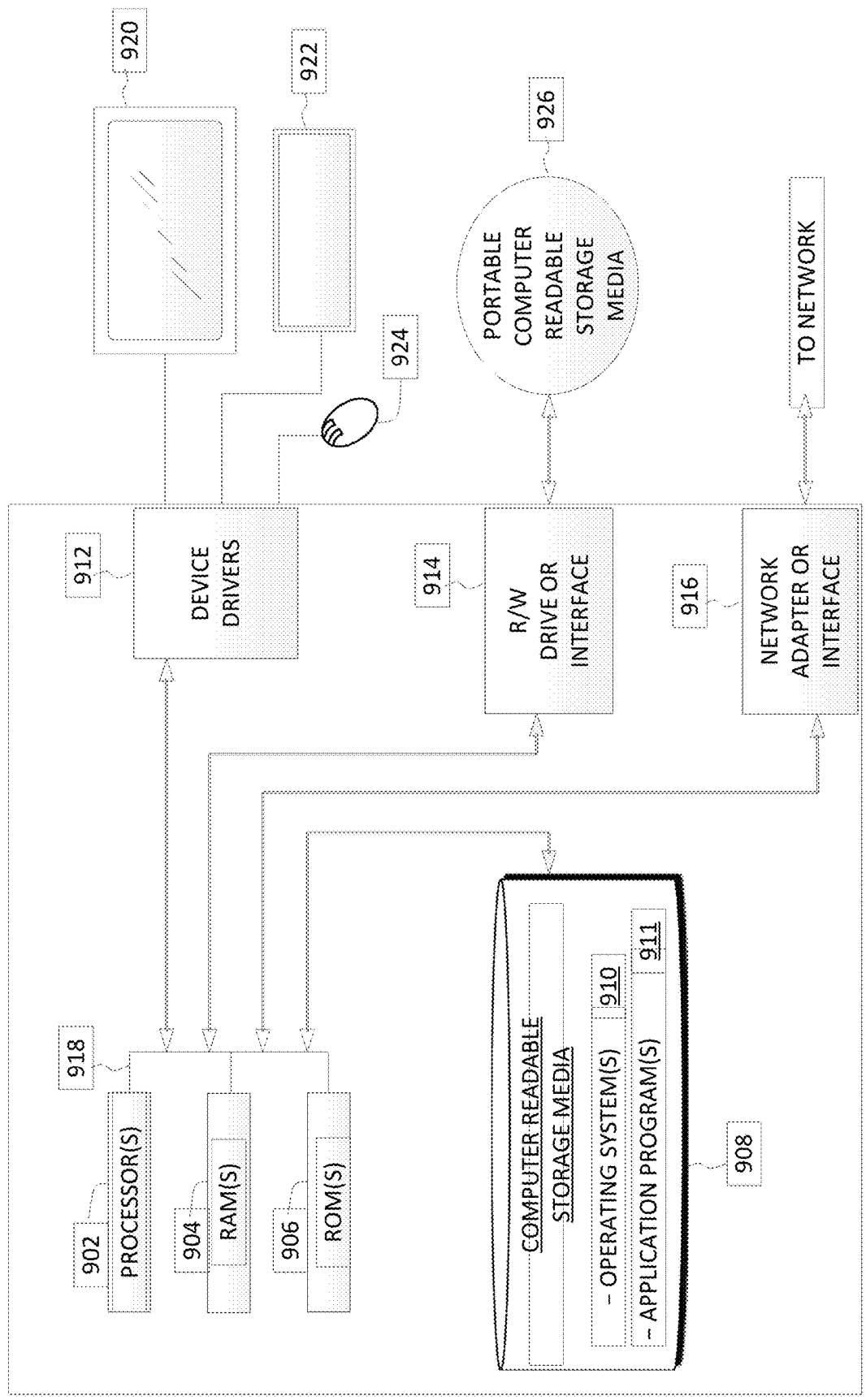
FIG. 5 depicts a block diagram of components of a media playing device 110 of the computing environment 100 of FIG. 1, in accordance with an embodiment of the present invention.

FIG. 5 depicts a block diagram of components of media playing device 110 in the computing environment 100 for generating and playing back of preferred media playlists via utilization of biometric, environmental, and/or location sensor data, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Media playing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, portions of the computing environment 100 for generating and playing back of preferred media playlists via utilization of biometric, environmental, and/or location sensor data, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Media playing device 110 may also include a R/W drive or interface 914 to read from and write to one or more portable computer readable storage media 926. Application programs 911 on media playing device 110 may be stored on one or more of the portable computer readable storage media 926, read via the respective R/W drive or interface 914 and loaded into the respective computer readable storage media 908.

Media playing device 110 may also include a network adapter or interface 916, such as a TCP/IP adapter card or wireless communication adapter (such as a 4G wireless communication adapter using OFDMA technology). Application programs 911 on media playing device 110 may be downloaded to the computing device from an external computer or external storage device via a network 108 (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Media playing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
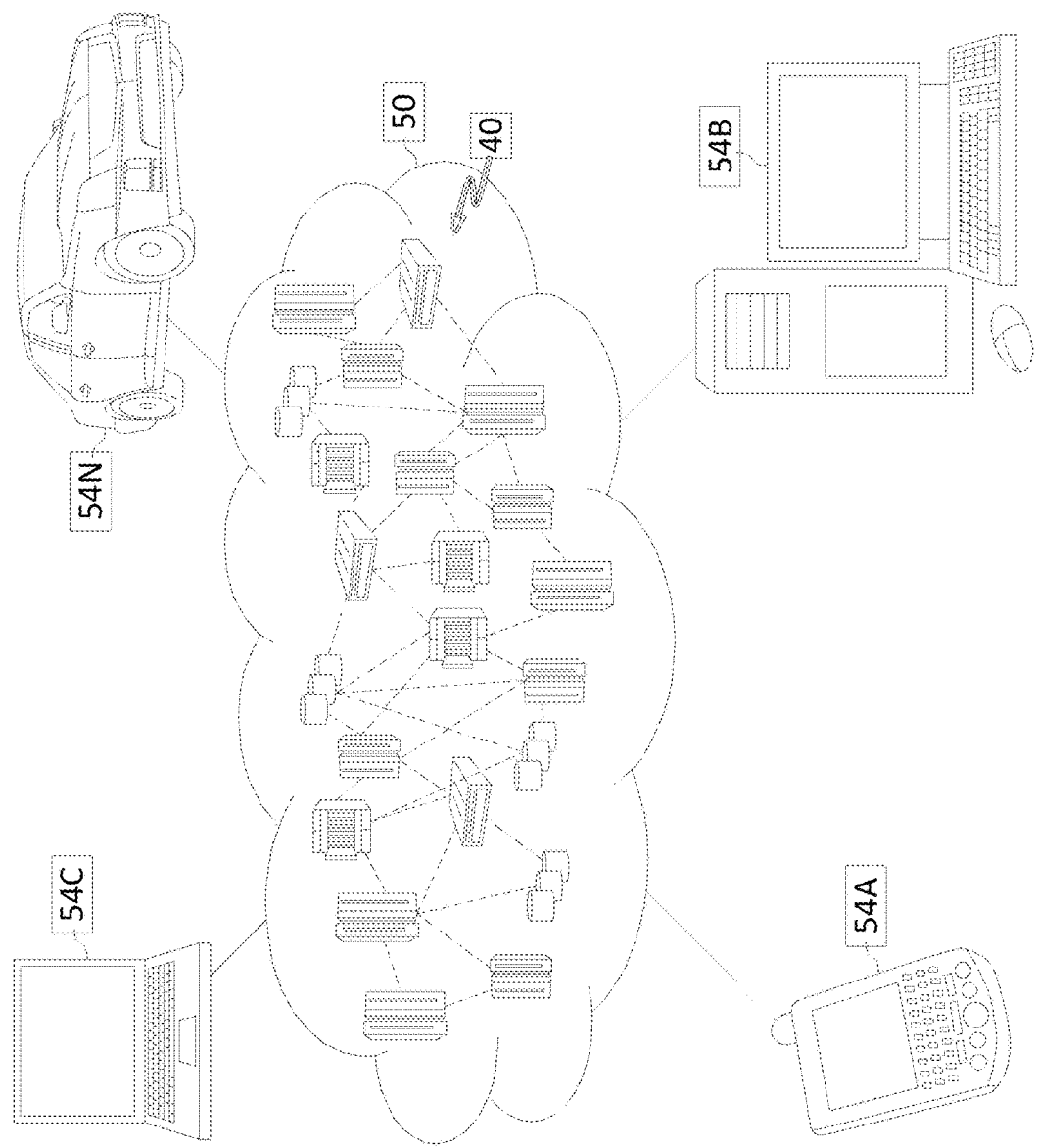
FIG. 6 depicts a cloud computing environment 50, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
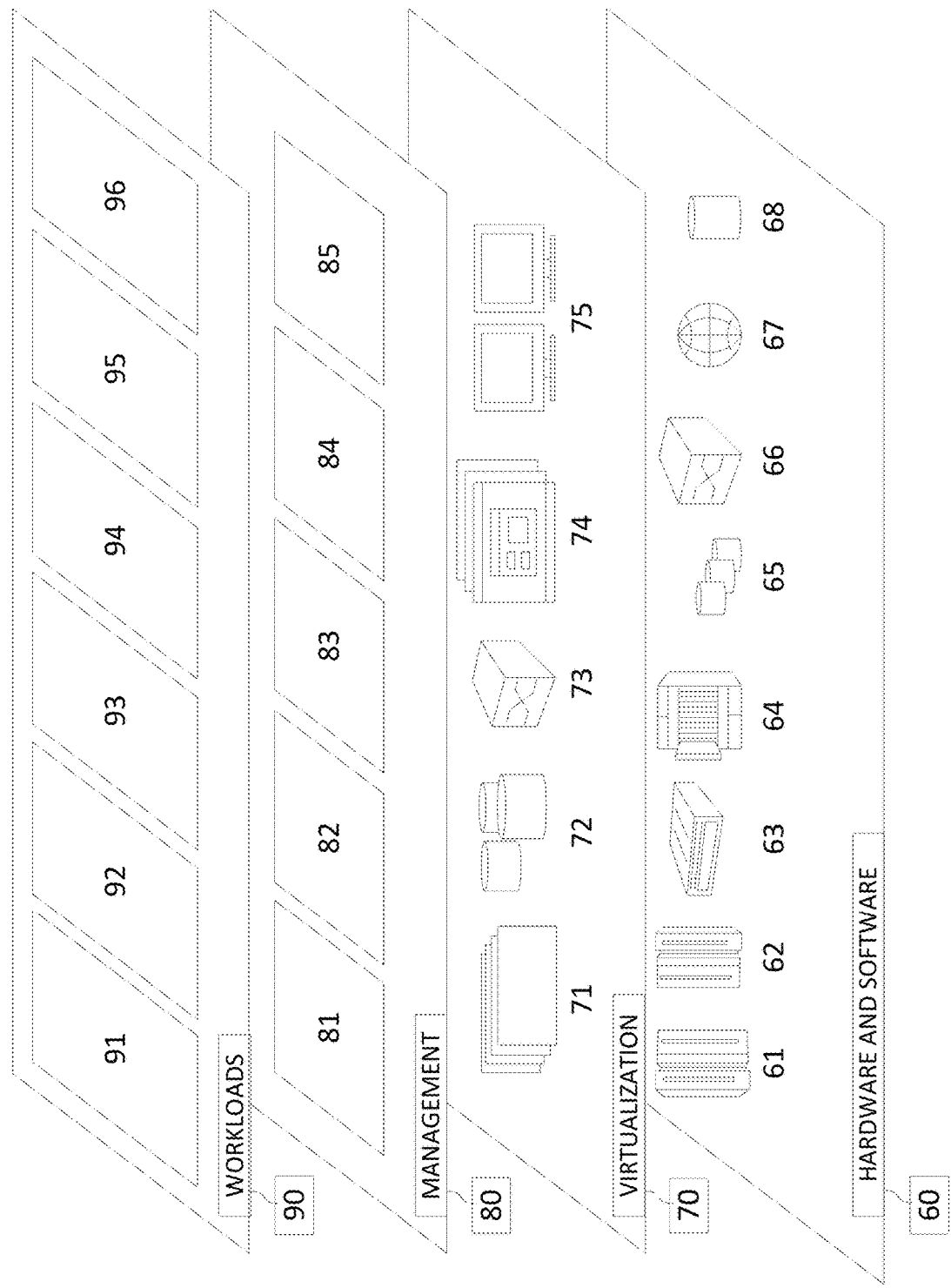
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the computing environment 100 for generating and playing back of preferred media playlists via utilization of biometric, environmental, and/or location sensor data.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A computer-implemented method for generating a preferred media playlist based on a determined activity type, the method comprising:
   playing a media item from a media library;
   collecting by a computing device metadata regarding the played media item;
   receiving by the computing device real-time sensor data of a user from one or more sensors associated with the user;
   determining by the computing device an activity type of the user based upon the received real-time sensor data of the user;
   generating by the computing device a media item record comprising a media item identification for the media item, the metadata collected regarding the played media item and the determined activity type of the user;
   ranking the media item records based upon the metadata regarding the played media item and the determined activity type of the user; and
   generating by the computing device a preferred media playlist comprising a plurality of generated media item records ranked highest.

2. The method of claim 1, wherein the preferred media playlist is presented to the user further comprising:
   receiving by the computing device a request to provide the preferred media playlist to the user;
   receiving real-time sensor data of the user from one or more sensors associated with the user;
   determining by the computing device a current user activity based on the received real-time sensor data of the user;
   selecting automatically by the computing device the preferred media playlist based upon the determined current user activity; and
   playing back the preferred media playlist to the user.

3. The method of claim 2, wherein selecting automatically by the computing device the preferred media playlist automatically prompts the computing device to collect new metadata regarding the preferred media playlist.

4. The method of claim 2, wherein the current user activity is determined by the computing device comparing the received real time sensor data of the user received from the one or more sensors associated with the user with a preconfigured range of sensor data limits and determining by the computing device the current user activity via utilization of a best fit analysis.

5. The method of claim 2, wherein determining the current user activity further comprises accessing by the computing device weather data and a timestamp, and utilizing the weather data and the timestamp in determining the current activity type.

6. The method of claim 1, wherein the real-time sensor data of the user comprises biometric sensor data of the user, environmental sensor data associated with the user, and the user location, and determining the activity type of the user comprises:

mapping by the computing device the biometric sensor data of the user, environmental sensor data associated with the user, and the user location received from the sensor data to a historically determined activity type of the user.

7. The method of claim 1, wherein collecting by the computing device metadata regarding the played media item comprises one or more of the following:

receiving a "like" marking;
    receiving a "love" marking;
    receiving a "dislike" marking;
    receiving a high rating;
    receiving a low rating;
    skipping to another media item in a queue of media items;
    adding a played media item to the preferred media playlist; and
    downloading the played media item to a media playing device offline.

8. The method of claim 1, wherein the real-time sensor data of the user comprises biometric sensor data associated with the user and environmental sensor data associated with the user.

9. The method of claim 1, wherein generating the preferred media playlist further comprises:

accessing by the computing device historically generated media item records with a same determined activity type of the user from a database;
    selecting historically generated media item records with the same determined activity type of the user; and
    adding the selected historically generated media item records with the same determined activity type of the user to the preferred media playlist.

10. A computer program product for generating a preferred media playlist based on a determined activity type, the computer program product comprising:

one or more non-transitory computer-readable storage media and program instructions stored on the one or more non-transitory computer-readable storage media, the program instructions, when executed by a computer, cause the computer to perform a method comprising:

playing a media item from a media library;
    collecting by a computing device metadata regarding the played media item;
    receiving by the computing device real-time sensor data of a user from one or more sensors associated with the user;
    determining by the computing device an activity type of the user based upon the received real-time sensor data of the user;
    generating by the computing device a media item record comprising a media item identification for the media item, the metadata collected regarding the played media item and the determined activity type of the user;
    ranking the media item records based upon the metadata regarding the played media item and the determined activity type of the user; and
    generating by the computing device a preferred media playlist comprising a plurality of generated media item records ranked highest.

11. The computer program product of claim 10, wherein the method performed further comprises:

receiving by the computing device a request to provide the preferred media playlist to the user;
    receiving real-time sensor data of the user from one or more sensors associated with the user;
    determining by the computing device a current user activity based on the received real-time sensor data of the user;
    selecting automatically by the computing device the preferred media playlist based upon the determined current user activity; and
    playing back the preferred media playlist to the user.

12. The computer program product of claim 11, wherein selecting automatically by the computing device the preferred media playlist automatically prompts the computing device to collect new metadata regarding the preferred media playlist.

13. The computer program product of claim 11, wherein the real-time sensor data of the user comprises biometric sensor data of the user, environmental sensor data associated with the user, and the user location, and determining the activity type of the user comprises:

mapping by the computing device the biometric sensor data of the user, environmental sensor data associated with the user, and the user location received from the sensor data to a historically determined activity type of the user.

14. The computer program product of claim 11, wherein the current user activity is determined by the computing device comparing the received real time sensor data of the user received from the one or more sensors associated with the user with a preconfigured range of sensor data limits and determining by the computing device the current user activity via utilization of a best fit analysis.

15. The computer program product of claim 11, wherein generating the preferred media playlist further comprises:

accessing by the computing device historically generated media item records with a same determined activity type of the user from a database;
    selecting historically generated media item records with the same determined activity type of the user; and
    adding the selected historically generated media item records with the same determined activity type of the user to the preferred media playlist.

16. A computer system for generating a preferred media playlist based on a determined activity type, the computer system comprising:

one or more computer processors, one or more computer-readable storage media, and program instructions stored on one or more of the computer-readable storage media for execution by at least one of the one or more processors, the program instructions, when executed by a computer, cause the computer to perform a method comprising:

playing a media item from a media library;
    collecting by a computing device metadata regarding the played media item;
    receiving by the computing device real-time sensor data of a user from one or more sensors associated with the user;
    determining by the computing device an activity type of the user based upon the received real-time sensor data of the user;
    generating by the computing device a media item record comprising a media item identification for the media item, the metadata collected regarding the played media item and the determined activity type of the user;
    ranking the media item records based upon the metadata regarding the played media item and the determined activity type of the user; and generating by the computing device a preferred media playlist comprising a plurality of generated media item records ranked highest.

17. The computer system of claim 16, wherein the method performed further comprises:
receiving by the computing device a request to provide the preferred media playlist to the user;
receiving real-time sensor data of the user from one or more sensors associated with the user;
determining by the computing device a current user activity based on the received real-time sensor data of the user;
selecting automatically by the computing device the preferred media playlist based upon the determined current user activity; and
playing back the preferred media playlist to the user.

18. The computer system of claim 16, wherein selecting automatically by the computing device the preferred media playlist automatically prompts the computing device to collect new metadata regarding the preferred media playlist.

19. The computer system of claim 16, wherein the real-time sensor data of the user comprises biometric sensor data associated with the user and environmental sensor data associated with the user.

20. The computer system of claim 16, wherein the current user activity is determined by the computing device comparing the received real time sensor data of the user received from the one or more sensors associated with the user with a preconfigured range of sensor data limits and determining by the computing device the current user activity via utilization of a best fit analysis.

* * * * *